United States Patent [19]

Lamoreaux

[11] Patent Number: 4,925,493

[45] Date of Patent: May 15, 1990

[54] SOIL MIXTURE AND METHOD OF MAKING SAME

[76] Inventor: Michael A. Lamoreaux, 526 W. North, St. Marys, Ohio 45885

[21] Appl. No.: 344,312

[22] Filed: Apr. 26, 1989

[51] Int. Cl.$^5$ .................................................. C08L 91/06
[52] U.S. Cl. ...................... 106/272; 106/491; 106/900
[58] Field of Search .............. 523/442; 106/272, 900, 106/484, 491

[56] References Cited

U.S. PATENT DOCUMENTS

| | | | |
|---|---|---|---|
| 3,090,756 | 5/1963 | Kaufmann | 252/71 |
| 4,312,901 | 1/1982 | Kekish | 427/236 |
| 4,361,661 | 11/1982 | Jackson | 523/442 |
| 4,482,271 | 11/1984 | Mitchell et al. | 405/157 |
| 4,615,741 | 10/1986 | Kobayashi | 106/484 |

*Primary Examiner*—Theodore Morris
*Attorney, Agent, or Firm*—Robert W. Becker & Associates

[57] ABSTRACT

A soil or dirt mixture that will not freeze into a stiff mass, and a method of making the same, are provided. The mixture is comprised of soil and wax, especially paraffin wax. The soil and wax are heated up, and are then mixed together while being continuously stirred until the mixture is cool.

5 Claims, No Drawings

SOIL MIXTURE AND METHOD OF MAKING SAME

BACKGROUND OF THE INVENTION

The present invention relates to a soil or dirt mixture that will not freeze into a stiff mass.

Dirt or soil that freezes as a result of moisture contained therein is undesirable for numerous applications. For example, traps that are covered by ordinary dirt to camouflage their presence from animals that are being trapped often become inoperative during freezing winter conditions due to the fact that the dirt freezes, thereby preventing the trap from firing. A solution to this problem is sorely needed.

Unfortunately, solutions proposed to date are either ineffective or are too complicated or expensive. For example, U.S. Pat. No. 3,090,756, Kaufmann, dated May 21, 1963, addresses the problem of inhibiting freezing of wetted piles of granular materials, such as coal, ore, limestone, gravel, sand, clay, and other rock-like or earth-like materials. The solution proposed by this patent is to mix into the wetted granular material a mixture of a granular inert filler material and an anti-freeze salt and a substantial amount of an alkali metal iron cyanide and a compatible fatty acid derivative and a compatible sticking agent, thereby at least partially coating the granular material particles with an iron cyanide and salt mixture to retard the freezing-together tendencies of the treated material granules. This complicated and expensive procedure leaves much to be desired.

U.S. Pat. No. 4,312,901, Kekish et al, dated Jan. 26, 1982, also addresses the problem of preventing mineral products such as coal, iron ore, clays, crude uranium ores, and other both crude and refined materials from freezing together or to the sides of containers during transport of the material. The solution presented by this patent is a spray composition that comprises 55–97% by weight of a fuel oil, and 3–45% by weight of a hydrocarbon oil-soluble surfactant.

Thus, none of the prior art of which the applicant is aware addresses the problem with which the present invention concerns itself.

It is therefore an object of the present invention to provide a new, straightforward, effective, inexpensive approach to preventing dirt or soil from freezing into a stiff mass.

This object, and other objects and advantages of the present invention, will appear more clearly from the following description.

SUMMARY AND PREFERRED EMBODIMENTS OF THE PRESENT INVENTION

The soil or dirt mixture of the present invention comprises soil and wax, preferably paraffin wax. The soil can, for example, be loam, comprising sand, clay, and organic matter. Pursuant to a preferred embodiment of the inventive soil mixture, 0.75 to 1.0 pound paraffin is provided per 20 pounds soil.

Pursuant to the method of the present invention, soil is sifted to provide a fine, granular soil, this soil is then heated to approximately 165°–180° F., wax is melted to approximately 250°–300° F., and the melted wax is mixed with the heated soil, with the mixture being stirred continuously until the soil mixture is cool.

The soil mixture of the present invention is extremely effective in repelling water, as a result of which the mixture will not freeze into a stiff mass under freezing winter conditions. Once the soil mixture has been produced, it looks and feels just like regular dirt or soil.

A further advantage of the inventive soil mixture for the trapping industry is that a natural looking product is produced that is also free of any scent.

It should be noted that the temperatures of the soil and wax during a mixing are critical paramaters. Obviously, the range of the temperature of, in particular, the wax, will vary with the type of wax. Although numerous types of wax could be used, paraffin wax is presently preferred; it is inexpensive, has a low melting point, and works very effectively. One suitable paraffin wax is designated FR5131, and is a fully refined paraffin wax sold by the Walnut Hill Company.

As indicated above, a preferred proportion of wax to soil is approximately 0.75 to one pound wax per 20 pounds dirt or soil. The lower limit is used where the dirt is looser, i.e. sandier. A loamy type of soil that is composed of clay, sand, and other organic matter is preferred. Straight sand and straight clay are undesirable inasmuch as they prevent proper penetration of the wax.

The inventive soil mixture is prepared as follows. In order to assure a fine, clean, granule-like starting material, the soil that has been selected is first sifted. For example, a three-eighths inch wire screen could be used that allows the soil to pass through yet prevents larger particles or matter, such as sticks, leaves, larger pebbles, etc., from passing through. The thus-sifted soil is then thoroughly heated, while being constantly stirred, to reach an even temperature of 165°–180° F. The wax must then be melted to liquid form, with this being accomplished by heating the wax to a temperature in the range of from 250°–300° F. The wax is then mixed with the soil, with the resulting mixture being stirred continuously until it is cool. This assures that the wax has completely seeped into the soil and that a homogeneous mixture is produced. The mixture is preferably slowly cooled to ambient temperature, preferably room temperature. However, if the mixing procedure is being accomplished out of doors, it may be necessary to supply some heat to the mixture to prevent the mixture from cooling off too rapidly, thereby inhibiting proper mixture of the soil and wax constituents.

The soil mixture that results has a natural appearance and is in a granular form, in other words, is present as loose dirt. However, the dirt is saturated with wax and will therefore repel water, so that it cannot freeze. As a matter of fact, water that comes into contact with the inventive soil mixture will bead up and run off the dirt, much in the way that rain runs off a freshly waxed car.

As indicated above, the temperatures of the soil and wax during the mixing process are critical parameters. If these temperatures are not kept within the prescribed range, the product could coagulate or form into clumps, and thereby be unsuitable for use. Overheating is also undesirable, inasmuch as scorching of the dirt and/or wax can occur. This discolors the soil and leaves an odor, which would leave the product unsuitable for use in trapping, inasmuch as animals would be repelled thereby. Furthermore, overheating can cause the wax to flash or ignite.

The inventive soil mixture has been described in particular in connection with the trapping industry. However, use of the inventive soil mixture should in no way be restricted to any one field, since it would have application anywhere that a soil or dirt mixture that will not freeze into a stiff mass is desirable. For example, the inventive soil mixture could be used in the construction industry, such as for temporary grading, and can be used for dirt tracks, such as horse-racing tracks.

The present invention, is, of course, in no way restricted to the specific disclosure of the specification, but also encompasses any modifications within the scope of the appended claims.

What I claim is:

1. A method of producing an odorless soil mixture that will not freeze into a stiff mass and will remain loose and granulated, including the steps of:

sifting soil to provide a fine, granular soil;

heating said sifted soil to a temperature in the range of approximately 165°–180° F.;

melting wax to a temperature in the range of approximately 250°–300° F.;

mixing said melted wax with said heated soil; and continuously stirring the resulting mixture until said mixture is cool.

2. A method according to claim 1, which includes the step of supplying a reduced heat to said mixture during a portion of said continuous stirring step.

3. A method according to claim 1, which includes the step of providing paraffin wax as said wax, and loam as said soil.

4. A method according to claim 3, which includes the step of providing approximately 0.75 to 1.0 pound of wax per 20 pounds of soil.

5. The product produced by the method of claim 1.

* * * * *